US012761434B2

(12) United States Patent
Ota et al.

(10) Patent No.: US 12,761,434 B2
(45) Date of Patent: Oct. 13, 2026

(54) OPTICAL FIBER RIBBON AND SLOT-LESS OPTICAL CABLE

(71) Applicant: SWCC Corporation, Kawasaki (JP)

(72) Inventors: Yuki Ota, Kawasaki (JP); Takeshiro Nagai, Kawasaki (JP); Kengo Tanabe, Kawasaki (JP); Wataru Noro, Kawasaki (JP)

(73) Assignee: SWCC Corporation, Kawasaki (JP)

( * ) Notice: Subject to any disclaimer, the term of this patent is extended or adjusted under 35 U.S.C. 154(b) by 239 days.

(21) Appl. No.: 18/574,228

(22) PCT Filed: Dec. 26, 2022

(86) PCT No.: PCT/JP2022/048020
§ 371 (c)(1), (2) Date: Dec. 26, 2023

(87) PCT Pub. No.: WO2023/127828
PCT Pub. Date: Jul. 6, 2023

(65) Prior Publication Data

US 2024/0319464 A1 Sep. 26, 2024

(30) Foreign Application Priority Data

Dec. 27, 2021 (JP) ................................ 2021-212640

(51) Int. Cl.
*G02B 6/44* (2006.01)

(52) U.S. Cl.
CPC ......... *G02B 6/4404* (2013.01); *G02B 6/4434* (2013.01); *G02B 6/448* (2013.01)

(58) Field of Classification Search
None
See application file for complete search history.

(56) References Cited

U.S. PATENT DOCUMENTS 10,101,549 B2 * 10/2018 Hoshino ................ G02B 6/441
10,598,888 B2 * 3/2020 Sato ...................... G02B 6/4405
10,718,917 B2 * 7/2020 Fallahmohammadi ...................... G02B 6/4404
11,036,024 B2 * 6/2021 Tanaka ................... G02B 6/448
(Continued)

FOREIGN PATENT DOCUMENTS

JP 2014202795 A 10/2014
JP 6657976 B2 3/2020
WO 2017122665 A 7/2017

*Primary Examiner* — Jerry Rahll
(74) *Attorney, Agent, or Firm* — The Roy Gross Law Firm, LLC; Roy D. Gross

(57) ABSTRACT

Disclosed is an optical fiber ribbon (1) in which a plurality of single-core coated optical fibers (11-22) are intermittently connected or separated in a length direction and a width direction while being connected every two cores. The optical fiber ribbon (1) satisfies conditional expressions [1], [2] when the length in the longitudinal direction of a connection portion (3) is denoted by A, the length in the longitudinal direction of a non-connection portion (5) in which separation portions (4) adjacent to each other overlap when viewing the separation portions (4) in the width direction is denoted by C, and the periodic interval in the longitudinal direction between the connection portions (3) is denoted by P. [1]: P≤150 mm [2]: A:C=25-45 mm:10-30 mm

2 Claims, 5 Drawing Sheets

(56) References Cited

U.S. PATENT DOCUMENTS

| | | | | |
|---|---|---|---|---|
| 2011/0110635 | A1 * | 5/2011 | Toge | G02B 6/441 385/102 |
| 2014/0016905 | A1 * | 1/2014 | Tanabe | G02B 6/4405 385/114 |
| 2014/0314382 | A1 * | 10/2014 | Sato | G02B 6/4434 385/103 |
| 2017/0285285 | A1 * | 10/2017 | Hoshino | G02B 6/4403 |
| 2018/0273427 | A1 * | 9/2018 | Tanaka | C03C 25/475 |
| 2018/0314020 | A1 * | 11/2018 | Sato | G02B 6/448 |
| 2019/0285823 | A1 * | 9/2019 | Tanaka | G02B 6/44 |

* cited by examiner

OPTICAL FIBER RIBBON AND SLOT-LESS OPTICAL CABLE

This application is a National Phase of PCT Patent Application No. PCT/JP2022/048020 having International filing date of Dec. 26, 2022, which claims the benefit of priority of Japanese Patent Application No. 2021-212640, filed Dec. 27, 2021, the contents of which are all incorporated herein by reference in their entirety.

TECHNICAL FIELD

The present invention relates to an optical fiber ribbon and a slotless optical cable.

BACKGROUND ART

In recent years, data traffic has increased dramatically due to popularization of Internet of Things (IoT), full-scale 5G commercialization, autonomous driving of automobiles, and so on, and worldwide demand has been increasing for the maintenance and construction of high-speed and high-capacity optical fiber communication networks that support such traffic.

In particular, information communication cables in European and American countries are often laid in underground ducts, and are physically constrained by the laying space in the ducts. In order to economically realize the maintenance and construction of high-speed and high-capacity optical fiber communication networks in the European and American countries, reducing the laying cost by introducing a cable which includes optical fiber cores at a higher density than a conventional cable while continuingly using existing ducts is strongly demanded.

As an example of such a high-density optical cable, an optical cable using an intermittent-coupling type optical fiber ribbon is disclosed in Patent Literature (hereinafter, referred to as "PTL") 1.

The technique of PTL 1 particularly aims to control a length of a coupling portion in a longitudinal direction, a length of a portion where non-coupling portions between different optical fiber cores overlap in the longitudinal direction, a length of each of the non-coupling portions in the longitudinal direction, and the like such that these lengths are constant, and to prevent occurrence of a failure of the optical fiber ribbon at the time of fusion-splicing while suppressing deterioration of transmission property of the optical fibers (see paragraphs [0026] to [0027], Examples, FIG. 1, and the like).

CITATION LIST

Patent Literature

PTL 1
U.S. Pat. No. 6,657,976

DISCLOSURE OF INVENTION

Technical Problem

Meanwhile, in the high-density optical cable, the optical fiber ribbon is deformably mounted so as to be folded when optical fiber ribbons are concentrated at a high density into a cable. This deformation changes overlap between the coupling portions and twist of the non-coupling portions depending on the length of the non-coupling portions of the intermittent structure. It has been known that these deformations of the optical fiber ribbons inside the cable greatly affect the "bending strain" of the optical fiber. Only evaluation conducted in the technique of PTL 1 is on the transmission property affected by transmission loss in a case where a 432-core optical fiber ribbon is used in a slotless type optical cable is (see the Examples), but bending strain property assuming high-density mounting is not considered.

Accordingly, a main object of the present invention is to provide an optical fiber ribbon capable of improving a bending strain property and a slotless optical cable using the same.

Solution to Problem

According to an aspect of the present invention to solve the above problems, an optical fiber ribbon is provided, including:

- a plurality of single-core coated optical fibers intermittently coupled to or separated from one another in a length direction and a width direction in a state in which every two of the plurality of single-core coated optical fibers are coupled to each other, in which
- when a length of a coupling portion in a longitudinal direction is denoted by "A," a length of a non-coupling portion in the longitudinal direction at which separating portions adjacent to each other as seen in the width direction of the separating portions overlap each other is denoted by "C," and a periodic interval of the coupling portion in the longitudinal direction is dented by "P," following conditional expressions (1) and (2) are satisfied:

$$P \leq 150 \text{ mm} \quad (1)$$

$$A{:}C = 25 \text{ to } 45 \text{ mm:} 10 \text{ to } 30 \text{ mm.} \quad (2)$$

According to another aspect of the present invention, a slotless optical cable is provided, the slotless optical cable including:

- the above-described optical fiber ribbon;
- a press winding for fixing a plurality of the optical fiber ribbons;
- a jacket covering the press winding;
- a tension member installed in the jacket; and
- a rip cord installed in the jacket for tearing the jacket.

Advantageous Effects of Invention

According to the present invention, it is possible to improve the bending strain property.

DESCRIPTION OF EMBODIMENTS

An optical fiber ribbon and a slotless optical cable according to a preferred embodiment of the present invention will be described. With respect to the description "to" indicating a numerical range, the lower limit value and the upper limit value are included in the numerical range in the present specification.

[Optical Fiber Ribbon]

Figure 1:
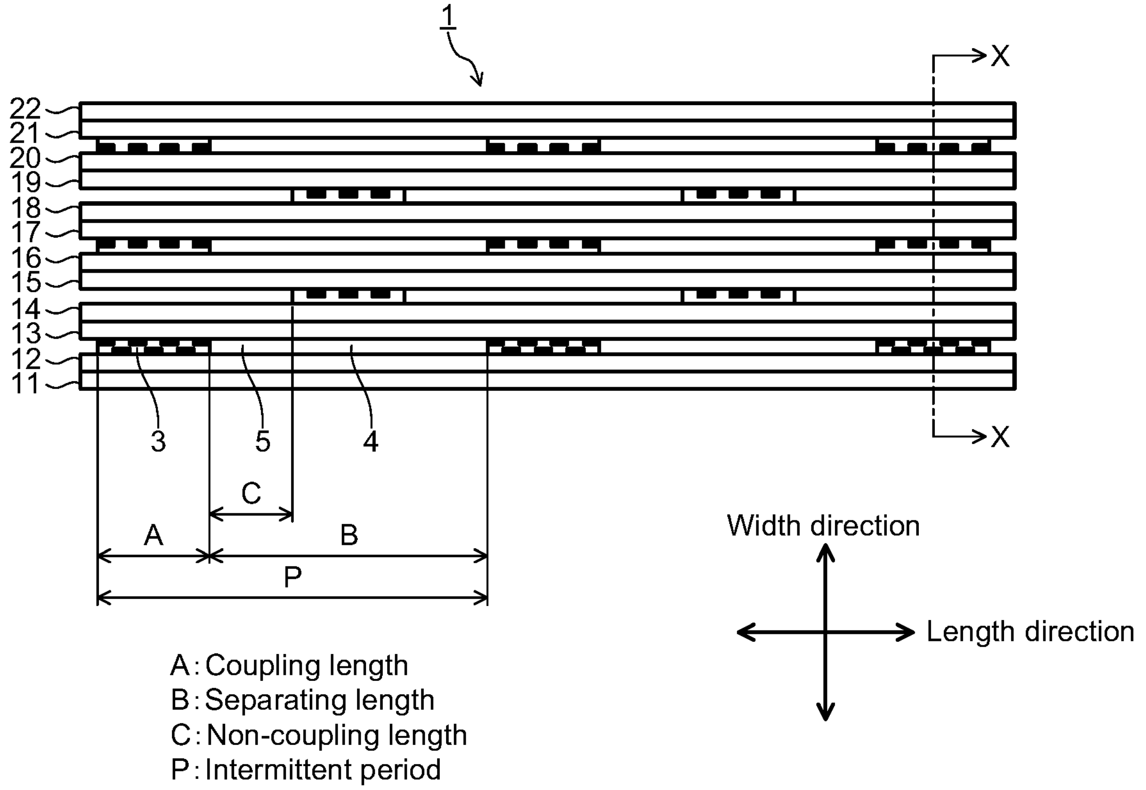
FIG. 1 is a plan view illustrating a schematic configuration of an optical fiber ribbon.

FIG. 1 is a plan view illustrating a schematic configuration of optical fiber ribbon 1.

As illustrated in FIG. 1, optical fiber ribbon 1 includes a plurality of single-core coated optical fibers 11 to 22 (12 fibers in FIG. 1). Each of single-core coated optical fibers 11 to 22 has a configuration in which an optical fiber strand is coated with a primary coating layer and a secondary coating layer successively.

Figure 2:
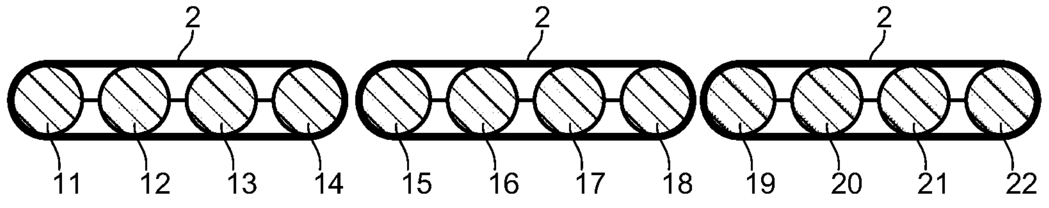
FIG. 2 is a cross-sectional view of FIG. 1 taken along line X-X.

As illustrated in FIG. 2, the surfaces of single-core coated optical fibers 11 to 22 are coated with coupling resin 2 for coupling the single-core coated optical fibers to one another, and as illustrated in FIG. 1, single-core coated optical fibers 11 to 22 are intermittently coupled to or separated from one another in the length direction and the width direction thereof in a state in which every two of the single-core coated optical fibers are coupled to each other. It is preferable that coupling resin 2 be a photocurable resin having a viscosity of 4.7 to 8.8 Pa·s at 25° C., and be an epoxy acrylate-based photocurable resin or a urethane acrylate-based photocurable resin.

As illustrated in FIG. 1, in optical fiber ribbon 1, coupling portions 3 in which the single-core coated optical fibers are coupled to one another and separating portions 4 in which the single-core coated optical fibers are separated from one another are intermittently formed. In separating portions 4, non-coupling portions 5 in which separating portions 4 adjacent to each other when seen in the width direction overlap each other are formed.

In such an optical fiber ribbon 1, letting "A" denote the length of each of coupling portions 3 in the longitudinal direction, "B" denote the length of each of separating portions 4 in the longitudinal direction, and "C" denote the length of each of non-coupling portions 5 in the longitudinal direction, and "P" denote the periodic interval of coupling portions 3 in the longitudinal direction, the following conditional expressions (1) and (2) are satisfied, and preferably, the following conditional expressions (1) and (3) are satisfied:

$$P \leq 150 \text{ mm} \tag{1}$$

-continued $$A:C = 25 \text{ to } 45 \text{ mm}:10 \text{ to } 30 \text{ mm} \tag{2}$$

$$A:C = 40 \text{ to } 45 \text{ mm}:30 \text{ mm} \tag{3}$$

According to optical fiber ribbon 1 described above, the ratio between length A of coupling portion 3 and length C of the non-coupling portion is controlled such that the lengths are constant. Thus, the bending strain property can be improved (see the following Examples).

[Production Apparatus and Production Method for Producing Optical Fiber Ribbon]

(1) Production Apparatus for Producing Optical Fiber Ribbon

Figure 5:
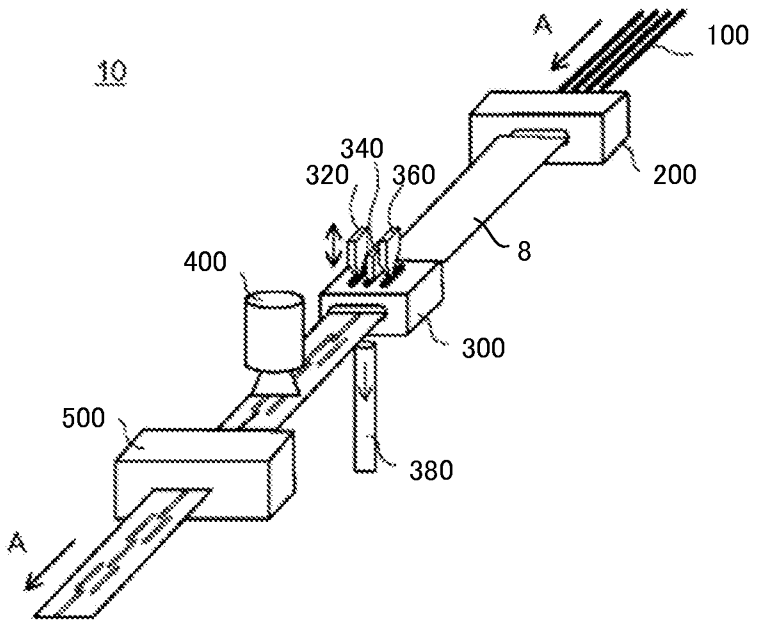
FIG. 5 is a perspective view illustrating a schematic configuration of a production apparatus for producing the optical fiber ribbon.

FIG. 5 is a diagram illustrating a schematic configuration of production apparatus 10 for producing the optical fiber ribbon.

As illustrated in FIG. 5, production apparatus 10 for producing the optical fiber ribbon is configured such that, mainly, tape die 200, separation die 300, and two light irradiation apparatuses 400 and 500 are installed in this order along conveyance direction A of single-core coated optical fibers 100, and single-core coated optical fibers 100 pass through these dice and the apparatuses in the order presented.

Tape die 200 is a general-purpose die for collectively coating the periphery of the plurality of single-core coated optical fibers 100 with a photocurable resin, and is configured to apply, in the form of tape, the uncured photocurable resin to the plurality of single-core coated optical fibers 100 passing through the tape die, so as to form tape layer 8.

Separation die 300 is provided with a plurality of (three in FIG. 5) separation needles 320, 340, and 360 which are vertically movable. Separation needles 320, 340, and 360 are disposed between and above single-core coated optical fibers 100, and middle separation needle 340 and opposite separation needles 320 and 360 are alternately raised and lowered with respect to the uncured photocurable resin. Separating portions 4 and coupling portions 3 are thus intermittently formed.

Resin suction apparatus 380 for sucking excess photocurable resin is installed in separation die 300. Resin suction apparatus 380 is configured to suck the excess photocurable resin blocked by the downward movement of separation needles 320, 340, and 360.

Upstream light irradiation apparatus 400 irradiates the uncured photocurable resin with light, and is configured to semi-cure the photocurable resin. The term "semi-curing" means a state in which the resin is not fully cured, that is, a state in which the resin is partially cross-linked by light energy.

Downstream light irradiation apparatus 500 further irradiates the semi-cured photocurable resin with light, and is configured to fully cure the photocurable resin. The term "fully curing" means a state in which the resin is cured to a state of being fully or nearly fully cured, that is, a state in which the resin is cross-linked to a state of being fully or nearly fully cross-linked by light energy.

Of upstream light irradiation apparatus 400 and downstream light irradiation apparatus 500, the integral irradiation amount is smaller in upstream light irradiation apparatus 400 and the integral irradiation amount is larger in downstream light irradiation apparatus 500.

(2) Production Method for Producing Optical Fiber Ribbon

When the plurality of single-core coated optical fibers 100 are conveyed along conveyance direction A (the conveyance speed is preferably 60 to 300 m/min), the uncured photocurable resin is first applied to the plurality of single-core coated optical fibers 100 in the form of tape by tape die 200. Tape layer 8 is thus formed.

Then, separation needles 320, 340, and 360 of separation die 300 are moved up and down with respect to tape layer 8, to form separating portions 4 and coupling portions 3 in tape layer 8.

Then, light irradiation apparatus 400 irradiates tape layer 8 with light to semi-cure the uncured photocurable resin. Finally, light irradiation apparatus 500 further irradiates the semi-cured photocurable resin with light to fully cure the semi-cured photocurable resin. During the processing of these steps, the temperature of tape die 200 is set higher than the temperature of separation die 300.

Figure 6:
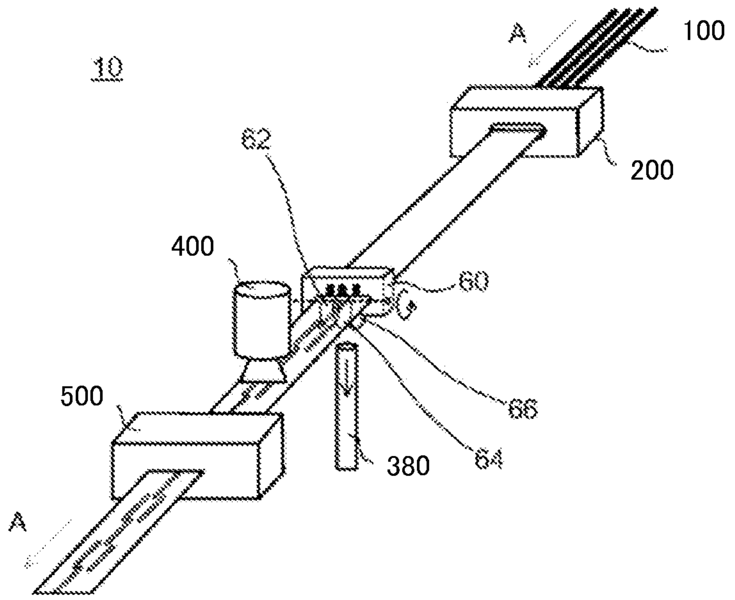
FIG. 6 is a diagram illustrating a schematic configuration of a production apparatus for producing an optical fiber ribbon according to a variation.

[Variation]Instead of separation die 300 of FIG. 5, separation die 60 of FIG. 6 may be applied.

In separation die 60 of FIG. 6, a plurality of (three in FIG. 6) rotary blades 62, 64, 66 are installed in the exit surface at which single-core coated optical fibers 100 exit. Rotary blades 62, 64, and 66 are configured to rotate following the conveyance of single-core coated optical fibers 100, and the rotation axes thereof coincide with one another.

Figure 7A:
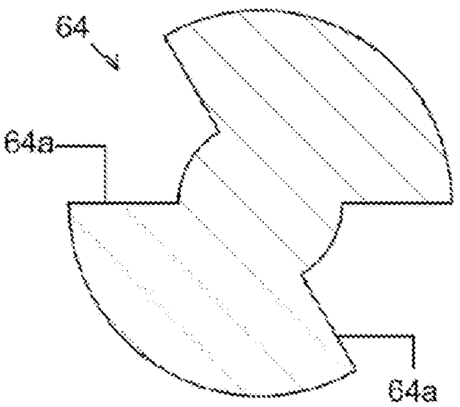
FIG. 7A is a side view illustrating a schematic configuration of a rotary blade of a separation die according to the variation.
Figure 7B:
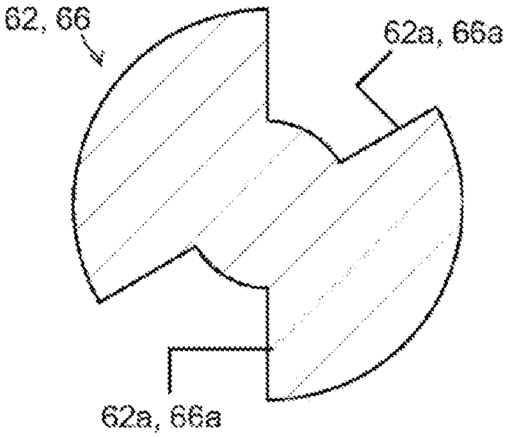
FIG. 7B is a side view illustrating a schematic configuration of the rotary blade of the separation die according to the variation.
Figure 7C:
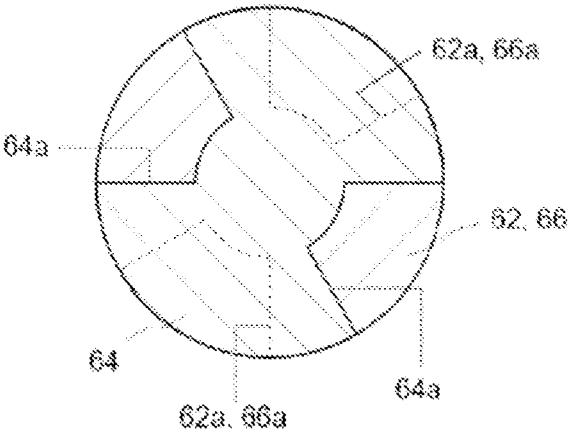
FIG. 7C is a side view illustrating a schematic configuration of the rotary blade of the separation die according to the variation.

As illustrated in FIG. 7A, notch portion 64*a* is formed in the middle portion of rotary blade 64, and notch portions 62*a* and 66*a* are formed also in rotary blades 62 and 66 on the opposite side portions as illustrated in FIG. 7B. As illustrated in FIG. 7C, notch portion 64*a* of rotary blade 64 of the middle portion is out of phase with respect to notch portions 62*a* and 66*a* of rotary blades 62 and 66 of the opposite side portions.

Figure 8:
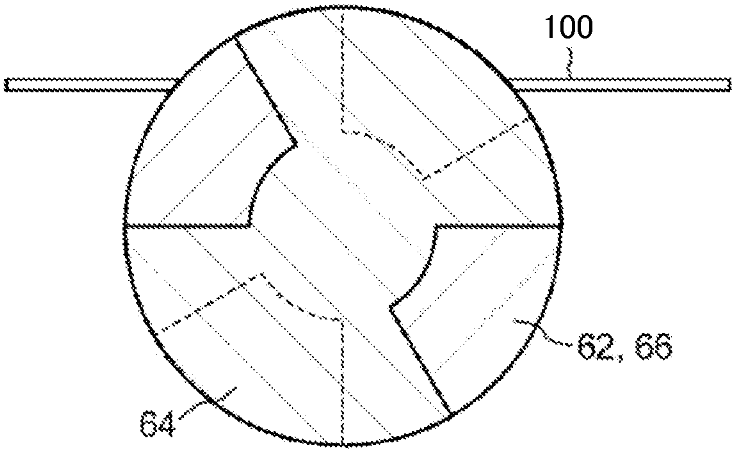
FIG. 8 is a side view schematically illustrating the state of the rotation of the rotary blade according to the variation.

As illustrated in FIG. 8, when rotary blades 62, 64, and 66 are rotated to follow the conveyance of single-core coated optical fibers 100, notch portion 64*a* of rotary blade 64 of the middle portion and notch portions 62*a* and 66*a* of rotary blades 62 and 66 of the opposite side portions are rotated while being out of phase with respect to each other. Separating portions 4 and coupling portions 3 are thus formed in an alternate manner.

[Slotless Optical Cable]

Figure 3:
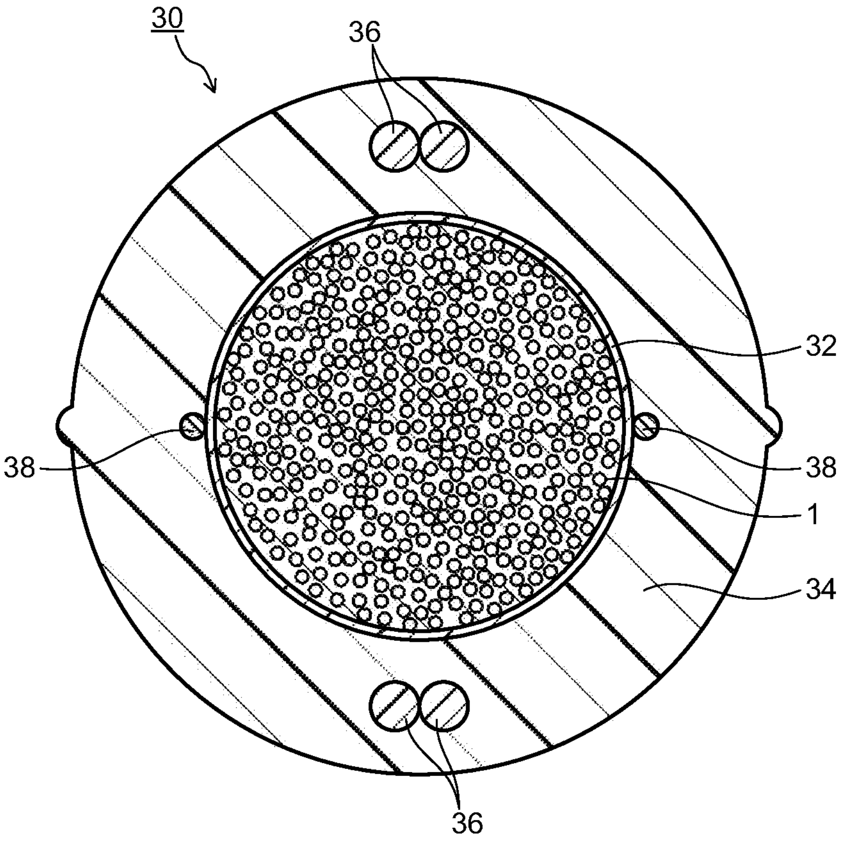
FIG. 3 is a cross-sectional view illustrating a schematic configuration of a slotless optical cable.

FIG. 3 is a cross-sectional view illustrating a schematic configuration of slotless optical cable 30 using optical fiber ribbon 1.

In slotless optical cable 30, a plurality of optical fiber ribbons 1 are bundled and stranded together, and are fixed by press winding 32. For example, six strips of 12-core optical fiber ribbon 1 are bundled together, and six bundles are stranded together. Then, the stranded body is fixed by press winding 32. It is preferable that a water-absorbing non-woven fabric be used as press winding 32, and in particular a non-woven fabric on which a water-absorbing polymer is laminated is used.

A polyethylene resin or the like is extruded onto press winding 32, and press winding 32 is covered by jacket 34. Two tension members 36 are installed on each of the upper and lower sides in jacket 34, and one rip cord 38 for tearing jacket 34 is also installed on each of the left and right sides.

According to slotless optical cable 30 described above, tension members 36 are installed on the upper and lower sides in FIG. 3. Accordingly, the flexibility in the left-right direction is secured, and it is thus possible to improve the working efficiency for laying the slotless optical cables in a duct. Since rip cords 38 are also installed at symmetric positions in the left-right direction (180-degree opposite positions) in FIG. 3, jacket 34 is easily divided in two equal portions and peeled off. It is thus possible to improve the working efficiency for cable termination or intermediate branching.

EXAMPLES

Example 1

(1) Manufacture of Samples

A single-core coated optical fiber having an outer diameter of 250 μm obtained by coating a quartz glass-based SM optical fiber having an outer diameter of 125 μm with a primary coating made of a urethane acrylate-based photocurable resin having a Young's modulus of about 5 MPa at 23° C. and a secondary coating made of a urethane acrylate-based photocurable resin having a Young's modulus of about 700 MPa at 23° C. was used as the single-core coated optical fibers.

Thereafter, 12 single-core coated optical fibers were arranged, and samples 1 to 6 of the optical fiber ribbon in which the respective parameters of length A of the coupling portion in the longitudinal direction, length C of the non-coupling portion in the longitudinal direction, and periodic interval P of the coupling portions in the longitudinal direction were varied were manufactured using a urethane acrylate-based photocurable resin (pre-curing viscosity at 25° C. is 5.2±0.5 Pa·s, Young's modulus after curing is 550 MPa).

(2) Evaluation of Sample-Bending Strain Measurement

Samples 1 to 6 of the slotless optical cable of FIG. 3 were produced using samples 1 to 6 of the optical fiber ribbon. Specifically, six pieces of sample 12-core optical fiber ribbons were prepared, and these optical fiber ribbons were bundled with a bundle tape to form a 72-core unit. Then, six 72-core units were stranded together, were fixed by a water-absorbing non-woven fabric as the press winding, were extrusion-coated with polyethylene, and covered by a jacket to produce samples 1 to 6 of a 432-core slotless optical cable.

Figure 4:
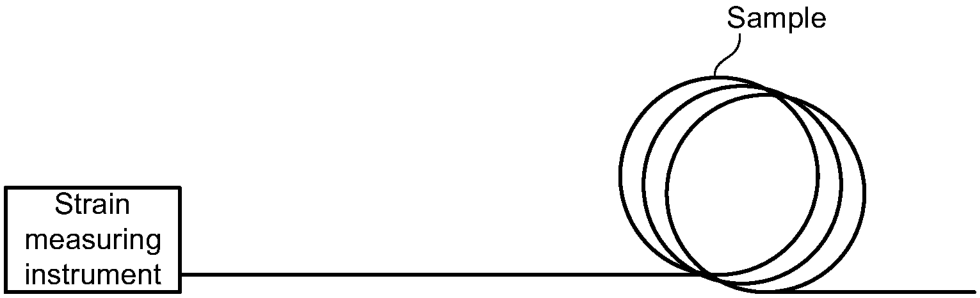
FIG. 4 is a diagram for explaining a measurement method for measuring a bending strain.

Thereafter, 30-m strips were cut respectively from samples 1 to 6 of the slotless optical cable, and one end of each strip was connected to a strain measuring instrument manufactured by Luna Technology (OPTICAL BACKSCATTER REFLECTOMETER Model OBR4600) and the other end thereof was left free. Then, intermediate portions of the cut strips were caused to loop three times at a certain bending radius (15 times the cable outer diameter), and the bending strains were measured by an Optical Frequency Domain Reflectometry (OFDR) (see FIG. 4).

A measurement result is illustrated in Table 1. In Table 1, "◎" indicates that the measured value is less than or equal to 0.05%, "○" indicates that the measured value is 0.1% or less and greater than 0.05%, and "x" indicates that the measured value is greater than 0.1%. When the measured value is "◎" or "○," the product can be used as a practical product.

TABLE 1

| Sample | Periodic interval | Length of coupling portion (A) | Length of non-coupling portion (C) | Bending strain |
|---|---|---|---|---|
| 1 | 70 mm | 25 mm | 10 mm | ○ |

TABLE 1-continued

| Sample | Periodic interval | Length of coupling portion (A) | Length of non-coupling portion (C) | Bending strain |
|---|---|---|---|---|
| 2 | 70 mm | 25 mm | 15 mm | ○ |
| 3 | 95 mm | 30 mm | 17.5 mm | ○ |
| 4 | 140 mm | 40 mm | 30 mm | ◎ |
| 5 | 150 mm | 45 mm | 30 mm | ◎ |
| 6 | 70 mm | 30 mm | 5 mm | X |

(3) Summary

As illustrated in Table 1, it can be seen that controlling the ratio between length A of the coupling portion and length C of the non-coupling portion such that the lengths are constant is useful for improving the bending strain.

Example 2

As a result of evaluation of the transmission property, mechanical property, and temperature property of sample 4 of the slotless optical cable, the results illustrated in Table 2 were obtained, and satisfactory results were obtained in terms of every property.

TABLE 2

| Cable characteristics evaluation result | | |
|---|---|---|
| Item | Test method | Evaluation result |
| Transmission loss | IEC 60793-1-40<br>1550 nm | ≤0.25 dB/km |
| Tensile property | IEC 60794-1-21 E1<br>2700N × 10 min<br>810N × 10 min | ≤0.10 dB/core |
| Lateral pressure property | IEC 60794-1-21 E3A<br>2200N/100 mm × 1 min | ≤0.10 dB/core |
| Impact property | IEC 60794-1-21 E4<br>1 kg × 1 m | ≤0.10 dB/core |
| Bending property | IEC 60794-1-21 E6<br>20D × 25 cycles<br>D: Cable outer diameter | ≤0.10 dB/core |
| Torsion property | IEC 60794-1-21 E7<br>±90°/2 m | ≤0.10 dB/core |
| Lost temperature property | IEC 60794-1-22 F1<br>−40 °C~+70 °C 3 cycles | ≤0.15 dB/km |
| Waterproof property | IEC 60794-1-22 F5C<br>Hydraulic head (length): 1 m<br>Tested length and duration:<br>40 m × 240 hr | No water leakage from end face |

This application claims priority from Japanese Patent Application No. 2021-212640, filed on Dec. 27, 2021. The disclosure of the specification and drawings is incorporated herein by reference in its entirety.

INDUSTRIAL APPLICABILITY

The present invention relates to an optical fiber ribbon and a slotless optical cable, and is particularly useful for improving a bending strain property.

REFERENCE SIGNS LIST

1 Optical fiber ribbon
2 Coupling resin
3 Coupling portion
4 Separating portion
5 Non-coupling portion
8 Tape layer
11-22 Single-core coated optical fiber
30 Slotless optical cable
32 Press winding
34 Jacket
36 Tension member
38 Rip cord
60 Separation die
62, 64, 66 Rotary blade
62*a*, 64*a*, 66*a* Notch portion
100 Single-core coated optical fiber
200 Tape die
60, 300 Separation die
320, 340, 360 Separation needle
380 Resin suction apparatus
400 (Upstream) light irradiation apparatus
500 (Downstream) light irradiation apparatus

The invention claimed is:

1. An optical fiber ribbon, comprising:

a plurality of single-core coated optical fibers intermittently coupled to or separated from one another in a length direction and a width direction in a state in which every two of the plurality of single-core coated optical fibers are coupled to each other, wherein when a length of a coupling portion in a longitudinal direction is denoted by "A," a length of a non-coupling portion in the longitudinal direction at which separating portions adjacent to each other as seen in the width direction of the separating portions overlap each other is denoted by "C," and a periodic interval of the coupling portion in the longitudinal direction is defined by "P," following conditional expressions (1) and (3) are satisfied:

$$140\text{ mm} \leq P \leq 150\text{ mm} \quad (1)$$

$$A{:}C = 40\text{ to }45\text{ mm}{:}30\text{ mm}. \quad (3)$$

2. A slotless optical cable, comprising:

an optical fiber ribbon according to claim 1;

a press winding for fixing a plurality of the optical fiber ribbons;

a jacket covering the press winding;

a tension member installed in the jacket; and a rip cord installed in the jacket for tearing the jacket.

* * * * *